United States Patent [19]

Voss

[11] Patent Number: 5,318,427
[45] Date of Patent: Jun. 7, 1994

[54] APPARATUS FOR CONTROLLING THE FLOW OF AIR FOR EXTERNAL COOLING OF AN EXTRUDER TUBULAR FILM

[75] Inventor: Klaus-Peter Voss, Lengerich, Fed. Rep. of Germany

[73] Assignee: Windmöller & Hölscher, Lengerich, Fed. Rep. of Germany

[21] Appl. No.: 880,652

[22] Filed: May 11, 1992

[30] Foreign Application Priority Data

May 10, 1991 [DE] Fed. Rep. of Germany ....... 4115320
Jul. 8, 1991 [DE] Fed. Rep. of Germany ....... 4122589

[51] Int. Cl.[5] ............................................. B29C 47/90
[52] U.S. Cl. .................................. 425/72.1; 425/143; 425/326.1; 425/387.1
[58] Field of Search ................. 425/72.1, 326.1, 387.1, 425/388, 392, 325, 327, 143, 144; 264/566, 569

[56] References Cited

U.S. PATENT DOCUMENTS

| | | | |
|---|---|---|---|
| 4,189,288 | 2/1980 | Halter | 425/72.1 |
| 4,209,475 | 6/1980 | Herrington et al. | 264/40.1 |
| 4,606,879 | 8/1986 | Cerisano | 264/566 X |
| 4,826,414 | 5/1989 | Planeta | 425/72.1 |
| 4,842,803 | 6/1989 | Bose et al. | 425/326.1 X |
| 4,938,903 | 7/1990 | Schaeffer et al. | 425/72.1 X |

FOREIGN PATENT DOCUMENTS

| | | | |
|---|---|---|---|
| 2056292 | 5/1972 | Fed. Rep. of Germany | 425/72.1 |
| 2658518 | 6/1978 | Fed. Rep. of Germany | 264/569 |

*Primary Examiner*—Richard L. Chiesa
*Attorney, Agent, or Firm*—Keck, Mahin & Cate

[57] ABSTRACT

An apparatus is provided for controlling the flow of air for external cooling of a tubular film issuing from an extruder head. To ensure that the flow of the air for external cooling to the point at which the tubular film begins to expand can be controlled regardless of the distance from that point to the extruder head, flow-directing flaps are evenly distributed around the tubular film and are displaceable along the tubular film.

5 Claims, 1 Drawing Sheet

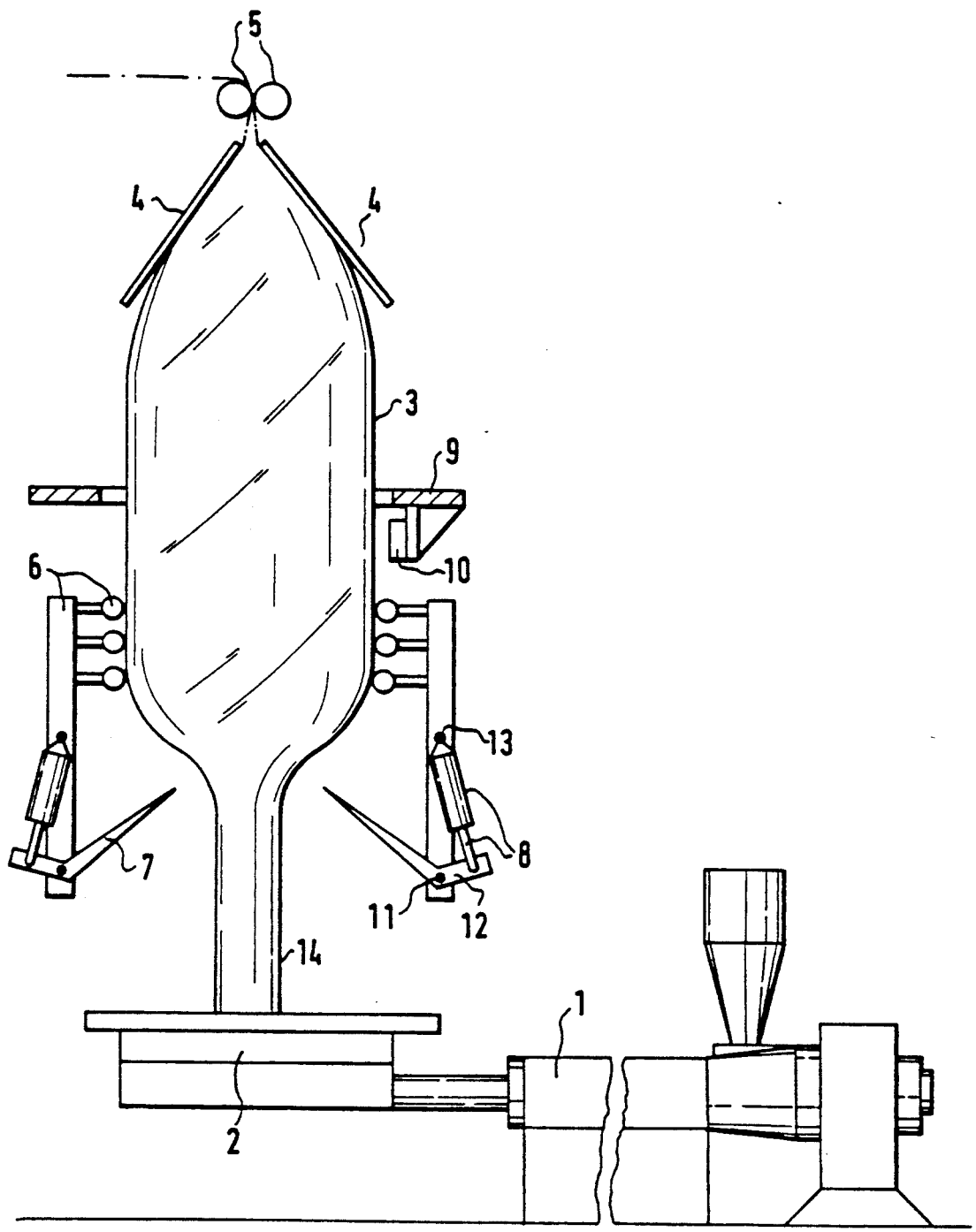

APPARATUS FOR CONTROLLING THE FLOW OF AIR FOR EXTERNAL COOLING OF AN EXTRUDER TUBULAR FILM

BACKGROUND OF THE INVENTION

1. Field of the Invention

This invention relates to an apparatus for controlling the flow of air for external cooling of a tubular film, issuing from an extruder head.

2. Description of the Prior Art

Such an apparatus is known from U.S. Pat. No. 4,209,475. In the known apparatus the air for external cooling is supplied through the extruder head in passages, which are disposed radially outwardly of the die through which the extrudate is discharged from the extruder head, and longitudinally adjustable, upwardly inclined plates extend into said passages.

The known apparatus can be used only when the extruder is operated in the so-called "short-neck" mode. On the other hand, if a tubular film is to be extruded in the so-called "long-neck" mode, the known apparatus will no longer be sufficient because in that case the region in which the tubular film is expanding is too far away from the extruder head so that the known apparatus can no longer act on said region.

SUMMARY OF THE INVENTION

It is an object of the invention to provide an apparatus of the kind described by which the flow of the air for external cooling can be controlled regardless of the distance from the extruder die to the point at which the film begins to expand.

In accordance with the invention there are provided air flow directing flaps, which are evenly distributed around the tubular film and are displaceable along the tubular film. By a displacement of the flaps along the tubular film the flaps can be adjusted to such a position that the air for external cooling which is supplied through the extruder head as previously, will act on the tubular film in the region in which said film is expanding. As a result, the flow of the air for external cooling to the point at which the film begins to expand can be controlled regardless of the distance from said point to the extruder die so that the apparatus in accordance with the invention can be used for an effective external cooling during an operation in the "short-neck" mode and in the "long-neck" mode.

Desirable further features within the scope of the invention will be described in the dependent claims.

The flaps may be adjustable and are preferably pivotally adjustable. According to a further desirable feature the flaps are adjustable or pivotally movable independently of each other so that the thermal action on the periphery of the tubular film can be varied around its periphery in such a manner that a uniform temperature profile is achieved around the tubular film.

The flaps are preferably upwardly inclined toward the tubular film so that the flow of air will be directed in a particularly desirable manner.

The flaps may be connected to means for calibrating the tubular film. The calibrating means are preferably displaceable along the tubular film. In that case the flaps will be displaced along the tubular film together with the calibrating means. Because calibrating means are generally adjusted to a position slightly above the point at which the bubble begins to expand, the flaps provided in accordance with the invention will then also be disposed always adjacent to the point at which the tubular film begins to expand, regardless of the distance from that point to the extruder head. The flaps, which are connected to the calibrating means, will correctly be adjusted together with such means.

The free ends of the flaps are desirably disposed shortly before the point where the tubular film begins to expand. That arrangement will ensure a particularly effective external cooling.

BRIEF DESCRIPTION OF THE DRAWING

An illustrative embodiment of the invention will now be described more in detail with reference to the drawing, which is a diagrammatic side elevational view of apparatus according to the invention.

DESCRIPTION OF PREFERRED EMBODIMENT

An extruder 1 comprises an extruder head 2, from which a tubular film 3 is upwardly extruded. The tubular film 3 is flattened in known manner by flattening plates 4 and is drawn off by a pair of draw-off and pinch rollers 5. In a manner known per se, calibrating means 6, known per se, are provided above the extruder head 2 and can be adjusted upwardly or downwardly along the tubular film to a position which will depend on the frost line. Pivoted flaps 7, which are evenly spaced around the tubular film 3, are connected to the calibrating means 6. Each flap is adjustable by an associated piston-cylinder unit independently of the other flaps 7. The flaps 7 are disposed under the calibrating means 6 and are closer to the extruder head 2 than the calibrating means 6. Each flap 7 is pivoted on a pivotal axis 11 and is upwardly inclined toward the tubular film 3. A lever arm 12 is connected to each flap 7 and is pivoted to the piston rod of a piston-cylinder unit 8. At that end which is remote from the piston rod, the cylinder of the piston-cylinder unit is pivoted to the calibrating means at 13.

Cooling air for the film is supplied in known manner through passages (not shown) in the extruder head, and the flaps 7 concentrate the air flow around the expanded bubble.

As is apparent from the single FIGURE of the drawing, the free ends of the flaps 7 are disposed shortly before the point at which the tubular film 3 begins to expand so that a thermal action varying around the tubular film can be exerted in that region on the periphery of the tubular film in such a manner that a uniform temperature profile will be achieved around the tubular film. Because the flaps 7 are connected to the calibrating means 6, the flaps 7 will follow any displacement of the calibrating means 6 along the tubular film. During operation the calibrating means 6 will be adjusted to a position closely above the point at which the bubble 3 begins to expand and, as a result, the flaps 7 connected to the calibrating means 6 will also be disposed adjacent to the point at which the tubular film 3 begins to expand, regardless of the distance from that point to the extruder head 2.

That portion of the extrudate which is nearest to the extruder head 2 may be described as a "neck" 14. In the single FIGURE of the drawing a relatively long neck 14 is shown and is succeeded by the expanding portion of the tubular film 3. The free ends of the flaps 7 are disposed adjacent to that expanding portion.

As is apparent form the drawing the apparatus can be used even during an operation in the "long-neck" mode. Although the neck 14 of the tubular film 3 is relatively long, the flaps 7 are disposed in the proper position so that the air for external cooling is applied to the bubble 3 where it is expanding.

A rotatable ring 6 is provided above the calibrating means 6 and carries a sensor 10 for measuring the thickness of the tubular film 3 around its periphery.

In the position shown in the FIGURE of the drawing the free ends of the flaps 7 are disposed shortly before the point at which the tubular film 3 begins to expand. An imaginary horizontal line form the free end of the leftmost flap 7, which is upwardly inclined to the right, to the free end of the rightmost flap 7, which is upwardly inclined to the left, will extend closely below the point at which the tubular film 3 begins to expand from the top end of the neck 14.

I claim:

1. An apparatus for controlling the flow of air for external cooling of a tubular film in which said tubular film, is extruded from an extruder head, comprising
   flaps evenly distributed around the tubular film for concentrating cooling air flow from the extruder head around the film wherein the flaps are pivotally movable along the tubular film and are attached to a calibrating device for the tubular film which is movable above the extruder head and along the tubular film.

2. An apparatus according to claim 1, wherein each one of said flaps is independently pivotally movable.

3. An apparatus according to claim 1 wherein the flaps are upwardly inclined toward the tubular film.

4. An apparatus according to claim 1, wherein a free end of each one of said flaps is disposed shortly before the point at which the tubular film begins to expand.

5. An extruder for making tubular film, comprising an apparatus according to claim 1 for controlling the flow of air for external cooling of the film.

* * * * *